United States Patent [19]

Jackson et al.

[11] 4,238,006
[45] Dec. 9, 1980

[54] RADIAL AXLE TRUCK DISC BRAKES

[75] Inventors: Keith L. Jackson; William C. Jones; Kenneth E. Spencer, all of Granite City, Ill.

[73] Assignee: General Steel Industries, Inc., St. Louis, Mo.

[21] Appl. No.: 936,211

[22] Filed: Aug. 24, 1978

[51] Int. Cl.³ .......................... B61F 5/30; B61F 5/38; B61H 5/00; B61H 13/26
[52] U.S. Cl. ...................... 188/59; 105/168; 105/182 R; 105/199 R; 105/224.1; 188/153 A
[58] Field of Search ........... 105/165, 168, 176, 199 R, 105/224 R, 224.1, 182 R; 188/58, 59, 70 R, 72.9, 153 A

[56] References Cited

U.S. PATENT DOCUMENTS

| | | | |
|---|---|---|---|
| 2,284,484 | 5/1942 | Eksergian | 188/153 A X |
| 2,286,563 | 6/1942 | Mussey | 105/224.1 |
| 2,440,020 | 4/1948 | Pratt | 188/153 R |
| 3,314,505 | 4/1967 | Pelikan | 188/59 |
| 3,344,893 | 10/1967 | Pelikan | 188/58 |
| 3,884,157 | 5/1975 | Pelabon | 105/199 R |
| 4,067,261 | 1/1978 | Scheffel | 105/224.1 X |
| 4,131,069 | 12/1978 | List | 105/168 |
| 4,134,343 | 1/1979 | Jackson | 105/224.1 X |
| 4,151,801 | 5/1979 | Scheffel et al. | 105/168 |

Primary Examiner—Howard Beltran
Attorney, Agent, or Firm—F. Travers Burgess

[57] ABSTRACT

A radial axle railway truck is provided with a disc brake system compatible with the radial axles comprising a single disc at the center of each axle adapted to be frictionally engaged by opposing shoes of a disc brake mechanism, the disc brake mechanism associated with each axle being supported by a yoke anti-rotatably mounted solely on truck framing supporting adaptors mounted on the axle bearings to take braking torque while accommodating free pivoting movement of the brake mechanism in the horizontal plane in accordance with movements of the axles from their tangent track positions to their curved track radial positions, such that no forces are applied by the disc brake mechanisms to the respective axles in opposition to the steering forces acting on the respective axles. Rigid links connect the diagonally opposite sides of the brake yokes on the respective axles to accommodate steering movements, in opposite senses, of the respective axles, the mountings of the adaptors on the axle bearings being constructed to permit limited relative movement of the axle bearings transversely of the truck with respect to the respective adaptors and brake support yokes supported thereby, whereby to permit the respective axles, while held in parallelism by the diagonal links, to move transversely of the truck with respect to each other sufficiently to follow horizontal offsets in the track rails without interference from the diagonal links.

15 Claims, 7 Drawing Figures

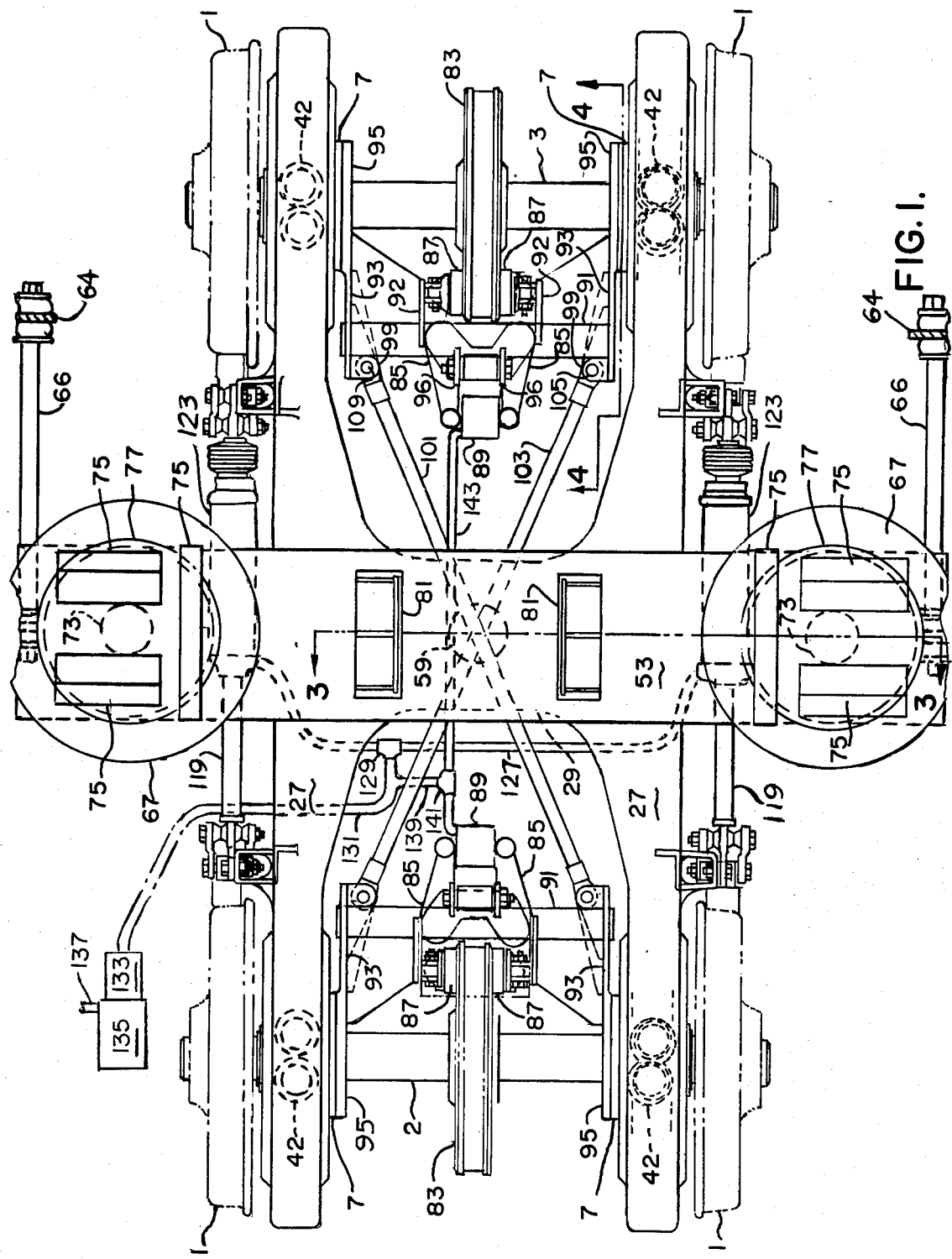

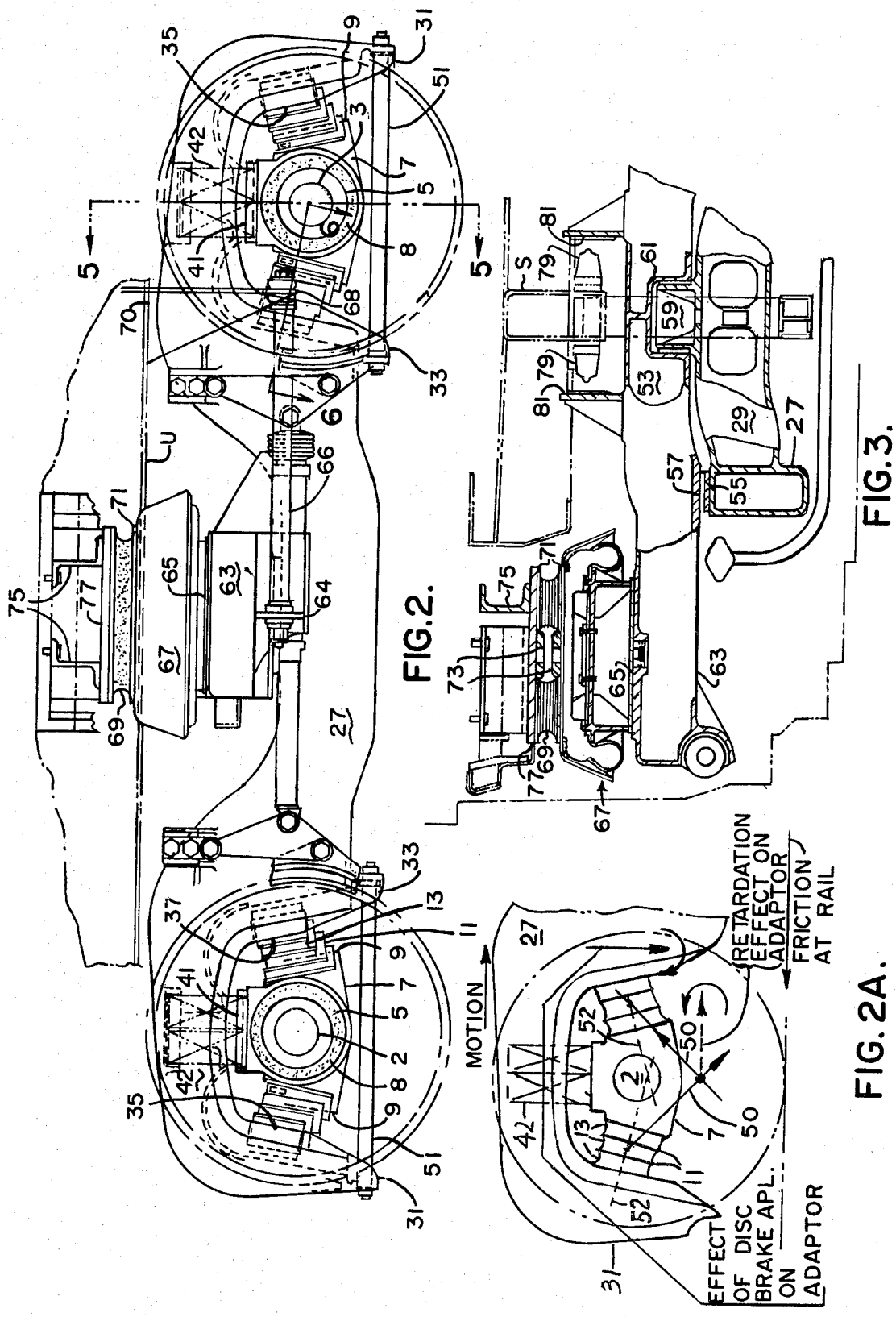

RADIAL AXLE TRUCK DISC BRAKES

BACKGROUND OF THE INVENTION

1. Field of the Invention

The invention relates to railway rolling stock and consists particularly in a radial axle truck with a compatible disc brake support arrangement.

2. The Prior Art

The use of a single disc mounted on the center of a railway axle for gripping engagement by shoes of a disc brake mechanism is exemplified in G. A. Pelikan U.S. Pat. No. 3,314,505, in which the disc brake mechanism is mounted on a transverse beam fixedly supported from the side frames of a truck. If this arrangement were applied to a radial axle truck, upon application of braking forces to the brake mechanism, the tendency of the latter would be to maintain the disc in its normal centered position which would be satisfactory on tangent track but would oppose radiation of the axles on curved track. In another patent to G. A. Pelikan, U.S. Pat. No. 3,344,893, a pair of discs having opposed slightly conical surfaces is mounted at the center of each axle and a wedge-shaped double-faced shoe mounted on a beam carried by the side frames is movable longitudinally toward the axle in the space between the opposed conical disc surfaces so as to brake the respective axle by wedging frictional engagement with the opposed conical surfaces. Because of the force exerted by this shoe device lengthwise of the truck, it too would tend to oppose the action of the wheel generated steering forces to cause radiation of the axles on curved track. B. Pratt U.S. Pat. No. 2,440,020 discloses a brake having three discs mounted in spaced relationship on the middle of each axle, the middle disc being rotatably mounted on the axle and providing a support for a brake mechanism having shoes engageable with the inner surface of the outer discs. The carrier disc and mechanism are provided with an arm extending toward the truck frame or bolster where it is supported by springs. If this arrangement were applied to a radial axle truck, the application of unequal forces by the brake shoes to the separate discs on the respective axles would tend to oppose the steering forces on the respective axles and thus interfere with proper radial positioning of the respective axles on curved track.

SUMMARY OF THE INVENTION

The invention provides radial axle trucks with a disc brake mechanism constructed and arranged to avoid interference with steering forces on the respective axles.

The invention provides a combined tread and disc brake system for radial axle trucks arranged to accommodate freely radiation of the axles on curved track responsive to steering forces applied to the axles.

According to the invention the disc brake comprises a disc mounted on the center of each axle, a disc brake mechanism having shoes engageable with the opposite faces of the disc and a supporting yoke for the mechanism of bifurcated shape with the extremities of its arms mounted on the respective axle bearing adaptors to take the braking torque into the axle bearing adaptors and thence into the truck frame.

The invention provides a radial axle railway truck, in which the diagonally opposite sides of disc brake supporting yokes supported on the ends of the respective wheel and axle assemblies are connected by rigid linkages, with means permitting movement of each axle with respect to the other transversely of the truck without interference from the rigid linkage connections.

The invention provides a radial axle truck in which the diagonally opposite sides of the brake supporting yokes mounted on axle bearing adaptors, which support the truck framing to permit steering movement of the respective axles, are connected by rigid linkages and the axle bearings are mounted in the adaptors for movement transversely of the truck with respect to the adaptors and the brake supporting yokes and thus permit transverse movement of the axles with respect to each other in conformity with lateral offsets in the track rails.

Among the objects of the invention are the provision of a radial axle truck construction wherein braking torque reaction is taken directly into structure mounted directly on the journal bearings rather than into the truck frame so as to avoid any interference from the braking torque reaction connection with steering movements of the respective axles, which might occur if the brake torque reaction arm were connected directly to the truck frame.

A still further object is to provide, in a radial axle truck wherein disc brake mechanism is supported solely from journal bearing structure, means for resiliently supporting the truck frame from the journal bearing structure which produces a torque on journal bearing structure in the opposite direction from the forward rotational direction of the wheels and of the braking torque reaction and thus resists tendencies of the braking torque reaction to rotate the journal bearing structure about the axes of the axles.

An additional object of the invention is to provide a radial axle truck in which disc brake actuating mechanism is supported from the journal bearing structure and the effective compression load lines through the resilient means supporting the truck frame from journal bearing mounted structure intersect at a level substantially below the axle centers whereby, when the brakes are applied and the wheels decelerate, the resilient devices on the trailing side of the axles are subjected to additional compression and the compression on the resilient devices on the leading side of the axles is equally reduced such that the reactions of the increased and reduced compressions act on the journal bearing structures at the intersection of the effective load lines to produce a torque on the journal bearing structures tending to rotate these structures in a direction opposite to the forward rotational direction of the wheels, and thus oppose tendencies of the disc brake torque reaction applied directly to the journal bearing-mounted structure by the disc brake mechanism support structure to rotate the journal bearing supported structure in the same direction as the forward rotational direction of the wheels.

The foregoing and additional objects and advantages of the invention will be evident from the accompanying drawings and description.

BRIEF DESCRIPTION OF THE DRAWINGS

FIG. 1 is a plan view of a four-wheel railway truck equipped with a brake system constructed in accordance with the present invention, showing the brake piping schematically.

FIG. 2 is a side elevational view of the truck illustrated in FIG. 1 showing the compatible tread brake arrangement.

FIG. 2A is a simplified side elevational view of an axle suspension showing the manner in which the disc brake torque reaction is opposed.

FIG. 3 is a transverse vertical sectional view along line 3—3 of FIG. 1.

DETAILED DESCRIPTION OF THE INVENTION

Figure 4:
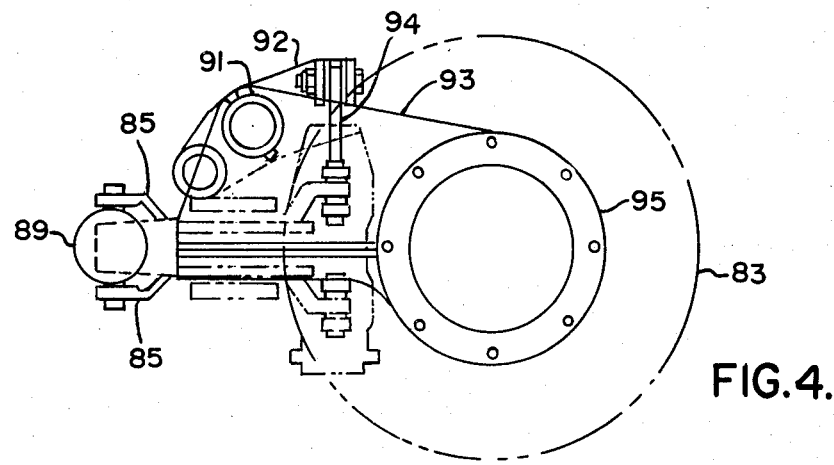
FIG. 4 is a longitudinal vertical sectional view taken along line 4—4 of FIG. 1.
Figure 5:
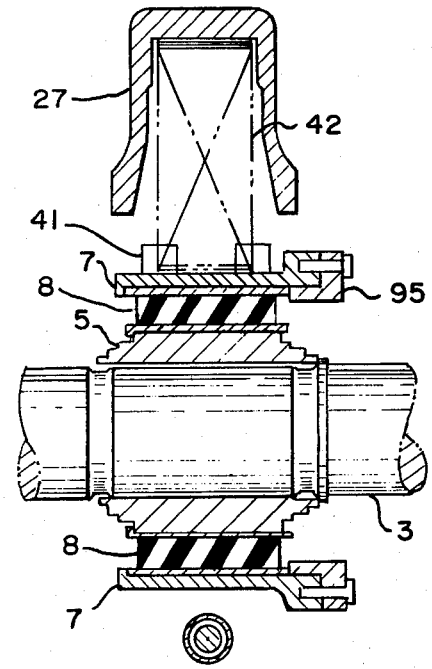
FIG. 5 is a fragmentary transverse vertical sectional view along line 5—5 of FIG. 2.
Figure 6:
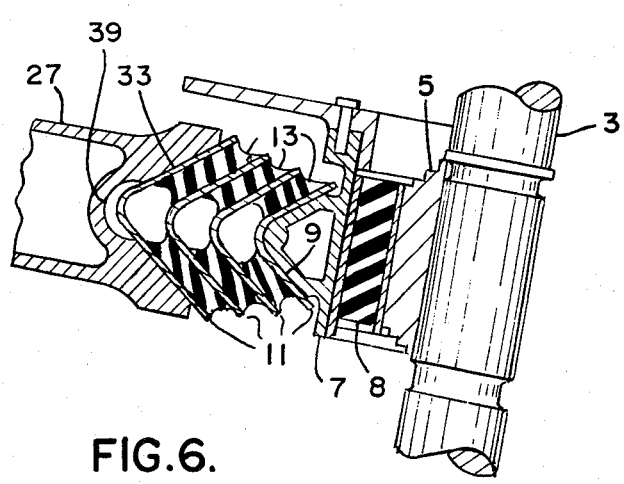
FIG. 6 is a fragmentary nearly horizontal sectional view taken along line 6—6 of FIG. 2.

The truck has a pair of spaced wheel and axle assemblies each comprising flanged wheels 1 mounted in gauged pairs on the ends of the respective axles 2 and 3. The effective conicity of the wheel tread profiles is sufficient to effect self-steering of each wheel and axle assembly by means of the differential effect between the wheel diameters of the outer and inner wheels on curved track and is substantially greater than the standard conicity of 1:20 or 0.05.

Inboard of the wheels each of the axles 2 and 3 mounts adjacent each wheel bearing structure comprising a journal bearing 5 and an adaptor 7 mounted thereon, the fore and aft surfaces 9 of each adaptor 7 being symmetrically inclined upwardly toward each other and being of acute V-shape in plan with their apices pointing away from the respective bearings 5. Correspondingly V-shaped elastomeric pad devices, comprising V-shaped metal plates 11 bonded to flat elastomeric pads 13 positioned between their opposing flat surfaces are secured to fore and aft surfaces 9 of the respective adaptor members 7.

To permit substantial movement of the axles and axle bearings 5 laterally of the truck with respect to the adaptors, for purposes which will appear more fully below, an annular elastomeric grommet 8 is clamped between the inner surfaces of each adaptor 7 and the outer surface of the respective bearing member 5 and is yieldable in shear transversely of the truck.

A rigid truck frame comprises longitudinally extending transversely spaced side members 27 positioned generally transversely inwardly of wheels 1 and connected at their midpoints by a transversely extending transom member 29. The end portions of side members 27 are elevated over axles 2 and 3 and are formed with downwardly open pedestal jaws defined by depending pedestal legs 31 and 33 spaced apart longitudinally of the truck a substantially greater distance than the maximum dimension, longitudinally of the truck, of axle bearing adaptors 7, and the inner surfaces 35 and 37 of pedestal legs 31 and 33 are symmetrically inclined slightly toward each other upwardly in a direction longitudinally of the truck and are of concave V-shape with their apices 39 pointing away from the respective axles, such that the surfaces 35 and 37 of the pedestal legs are parallel to the outer surfaces 9 of the bearing adaptors and surfaces 35 and 37 are seated on the outer plates 11 of the elastomeric sandwich devices 23, 25. The top surfaces of adaptors 7 are provided with upwardly open spring seats 41 in which are seated upright metal coil springs 42 which extend upwardly into pockets in the end portions of truck frame side members 27, such that the truck frame side members are supported jointly by V-shaped elastomeric pad devices 23, 25 and coil springs 43. With this arrangement substantial turning movements of the axles in the horizontal plane with respect to the truck frame are accommodated through longitudinal shear in V-shaped elastomeric pad devices 23, 25 and by the transverse shear in elastomeric grommets 8 along with transverse and longitudinal deflections in coil springs 42. To oppose any tendencies of pedestal legs 31 and 33 to spread apart longitudinally of the truck due to the longitudinal components of the load applied through chevron pad devices 23, 25, the lower ends of the pedestal legs are secured to each other by tie bolts 51. From the foregoing, it will be seen that on tangent track the axles will be in the positions shown in the drawings, i.e., normal to the longitudinal axis of the truck, but when on curved track because of the differential effect of the conically profiled wheel treads, the axles will turn in the horizontal plane, thereby assuming positions radial of the track curve, such turning movements being freely accommodated by the yieldability in shear longitudinally of the truck of the elastomeric elements in chevron pad devices 23, 25, transversely of the truck by elastomeric grommets 8, and the horizontal yieldability of coil springs 42.

For supporting the car body and its underframe U on the truck such that the truck can swivel to accommodate track curvature, a transverse bolster 53, preferably a casting of box section, overlies truck frame transom 29 and is supported on the truck frame side members 27 by slidably engaged upwardly and downwardly facing horizontal bearings 55 and 57 on the truck frame and bolster respectively. For accommodating swivel of the truck frame with respect to the bolster and transmitting longitudinal forces between them, truck frame transom 29 is formed with an upstanding cylindrical bearing element 59 at its center, which is pivotally received in a downwardly open cylindrical recess 61 in the bottom of bolster 53.

The end portions 63 of the bolster extend outwardly from truck frame side members 27 and have flat upwardly facing spring seat surfaces 65 on which are seated vertically and transversely yieldable pneumatic spring devices 67. An elastomeric sandwich device comprising an annular elastomeric pad 69 and annular boundary plates 71 is seated on top of each spring device 67 and held against horizontal movement with respect thereto by engagement of an upstanding annular boss 73 with the central aperture in bottom plate 71. By means of spaced channels 75, car underframe U mounts downwardly facing spring cap plates 77 each formed with a depending boss 73, spring cap plates 77 being seated on top of the respective elastomeric sandwich devices 69, 71 with depending bosses 73 received in the openings in the respective annular plates 71.

For limiting lateral movement of underframe U with respect to bolster 53, the underframe center sill S mounts a pair of transversely outwardly facing elastomeric bumpers 79 aligned with each truck bolster 53, and each truck bolster 53 is formed with a pair of transversely spaced and inwardly facing upstanding abutments 81 normally spaced from bumpers 79 and adapted to engage the latter as the limit of lateral motion is approached.

For transmitting longitudinal braking and traction forces between the truck bolster and the car underframe, both extremities of the bolster are provided with depending brackets 64 to which are pivotally secured longitudinally extending anchor links 66, the opposite end of each of which is pivotally secured at 68 to bracket structure 70 depending from the car underframe U.

An improved disc brake arrangement compatible with the steering movements of each axle includes a single disc 83 mounted at the center of each axle 2 and 3, and a fluid operated mechanism comprising a pair of levers 85 on both sides of the disc mounting shoes 87 engageable with the respective sides of the disc, and a pneumatic or hydraulic cylinder 89 for spreading the levers 83 and thereby moving the shoes into frictional engagement with the disc surfaces.

For supporting brake mechanism 85, 87, 89 and taking its torque reaction without interference with wheel-induced steering movements of the respective axles, a brake support yoke, consisting of a transverse tube 91 positioned between the respective axles 2 and 3 and center transom 29 and a pair of longitudinal arms 93, the annular end portions 95 of which are of annular shape anti-rotatably secured to the inner surfaces of the respective axle bearing adaptor 7, is provided. Each tube 91 mounts a pair of transversely spaced longitudinal brackets 92 extending toward the respective axle, and transversely swingable hangers 94 support shoes 87 from brackets 92. Brake torque reactions are thus taken by yokes 91, 92, 93, 95 from the brake shoes 87 into the axle bearing adaptors 7 and thence through pad devices 23, 25 and coil springs 42 into the truck frame.

As will be evident from FIG. 2A, the effective compression load lines 50 through V-shaped pad devices 11, 13 lie below the normals 52 of the pad devices and intersect at a level substantially below the axle centers such that when the brakes are applied, as wheels 1 decelerate, the pad devices 11, 13 on the trailing side of the axles are subjected to additional compression and the compression on pad devices 11, 13 on the leading side of the axles is equally reduced. The reactions of the increased and reduced compressions act on the journal bearing adaptors at the intersection of the effective load lines 50, thus producing a torque on the journal bearing adaptors 7 tending to rotate adaptors 7 in a direction opposite to the forward rotational direction of wheels 1 and thus opposing tendencies of the disc brake torque reaction applied directly to adaptors 7 by the brake support yoke side arms 93 to rotate adaptors 7 in the same direction as the forward rotational direction of wheels 1.

Substantially at axle level at the intersections of brake yoke arms 93 and tube 91, the brake yokes are formed with clevis-like brackets 99 and the diagonally opposed brackets on the two brake frames are connected by rigid diagonal links 101 and 103, the ends of which are pivotally secured by pin connection 105 to the respective brackets. Preferably the projections of the link axes intersect the centers of the respective axle bearings. Diagonal links 101 and 103 act through the yoke arms 93, adaptors 7, grommets 8 and axle bearings 5 to couple the wheel induced steering movements of the individual wheel and axle assemblies to cause their symmetrical turning movements in opposite directions on curved track and co-operate with the resistance offered by pad devices 23, 25 and 41 to oppose hunting movements of the wheel and axle assemblies on tangent track. Although the links 101 and 103 maintain the adaptors on both wheel and axle assemblies in longitudinal alignment when the axles are parallel, elastomeric grommets 8 yield in shear to permit lateral movements of the axle bearings with respect to the adaptors and of the axles with respect to each other when lateral offsets in the track rails, such as at turnouts, are encountered, thus reducing the likelihood of damage to the adaptors, brake yokes and/or linkages which might result if the axles were prevented from responding independently to such lateral offsets on the track structure.

Preferably, the truck also includes a tread brake arrangement co-operating with the disc brake system described above for braking the truck irrespective of whether the axles are parallel as on tangent track or steered in opposite senses as on curved track. The tread brake rigging at each side of the truck comprises a pair of substantially vertical brake levers 111 pivotally depending from outboard brackets 113 on the truck frame side members 27 and pivotally mounting at their lower ends brake heads 115 carrying the usual shoes 117 engageable with the adjacent wheel treads. Intermediate their lower ends levers 111 are connected respectively to a pair of aligned rods 119 and 121 extending longitudinally of the truck, rod 119 mounting a hydraulic cylinder 123 and rod 121 being connected to a piston (not shown) in cylinder 123. As best seen in FIG. 1, the cylinders 123 on opposite sides of the truck are connected by a transverse hydraulic conduit 127 which is connected intermediate its ends by a tee 129 to a conduit 131 connected at its other end to hydraulic booster 133 driven by pneumatic cylinder 135 which communicates with the car air brake system by conduit 137. A branch 139 of hydraulic brake line 131 communicates via a tee 141 with a conduit 143 leading to both disc brake cylinders 89. With this arrangement, when the car air brake system is actuated, air is admitted to pneumatic cylinder 135 to actuate hydraulic booster cylinder 133, creating hydraulic pressure in conduit 131 and its branch 139 and in tread brake conduit 127 and disc brake conduit 141, causing simultaneous application both of the tread and disc brakes. Because of the interconnection by means of conduit 127 of tread brake hydraulic cylinders 119 at each side of the truck, the tread brakes at both sides will be equalized irrespective of yaw of the axles on curved track when the wheel treads on the inside of the curve would be substantially closer to each other than those on the outside of the curves so that even when the axles are substantially radial of the curve, equal brake pressure would be applied to each wheel tread. The interconnection of disc brake cylinders 89 by means of conduit 143 also assures that the pressure on both disc brake cylinders will be equalized.

In order to approach a balance between the disc brake torque reaction on adaptors 7 tending to rotate adaptors 7 the same direction as wheels 1, and the torque resulting from the increased compression of the leading pad devices 11, 13, and the reduced compression of the trailing pad devices 11, 13 during deceleration due to braking which tends to rotate the adaptors in the opposite direction from the wheels, it has been found desirable to divide the total braking force substantially equally between the disc and tread brakes.

Operation of the truck incorporating the invention is as follows: While moving along tangent track, all tendencies of the individual axles to oscillate about vertical axes or to move lengthwise with respect to the truck frame are resisted by the resistance of elastomeric pad devices 23, 25 to shear and compression longitudinally of the truck, and diagonal links 101 and 103 co-operate with the resistance offered by pad devices 23, 25 to oppose any such oscillation or hunting movements of the individual axles. Although diagonal links 101 and 103 tend to keep the axles 2 and 3 parallel and to keep the axle bearing adaptors on both axles aligned during movements on tangent track, by reason of having links 101 and 103 connected to the adaptors 7 instead of to the axle bearings 5 and having the axle bearings 5 laterally movable in the adaptors 7 the axles, even though held parallel, are permitted to move laterally with respect to each other, so that the wheels may adjust to lateral irregularities in the track rails. When moving along curved track, the conically profiled wheel treads, by reason of the differential engagement of the inner and outer treads with the respective track rails, induce self-steering turning movements in the individual axles which are accommodated by the shear yieldability of V-shaped elastomeric pad devices 23, 25 and of elastomeric grommets 8 which, in turn, being coupled to each other to accommodate symmetrical turning movements in opposite senses of the individual axles, thus avoid interference with the self-steering capability of the respective wheel and axle assemblies which are thereby positioned substantially radially with respect to the track curvature.

If the brakes are applied by admission of fluid to cylinders 89, causing shoes 87 to grippingly engage the discs 83, no forces will be applied by the brakes to the axles tending, on tangent track, to cause the axles to yaw nor on curved track, tending to cause the axles to return to their normal tangent track positions, nor will the application of braking forces while the vehicle is on tangent track prevent the axles from assuming their curved track positions upon entering a curve nor, if the brakes are applied while the vehicle is on curved track, the brake application will not interfere with the return of the axles to their tangent track position by reason of the sole support of the brake mechanism or axle bearing adaptors 7, whereby the brake mechanism always turns in the horizontal plane in accordance with turning movements of the axle in a horizontal plane. If tread brakes of the type shown are also used in combination with the disc brakes, in view of the transverse interconnection between the tread brake cylinders at opposite sides of the truck, the tread brake mechanisms at both sides will assume the same length on tangent trackage so as to apply equal shoe pressure on all four wheel treads, but on curved trackage the outboard mechanism will be lengthened and the inboard mechanism shortened in accordance with relative longitudinal spacing of the inboard and outboard wheels caused by the steering action of the conical wheel treads and similarly shoe pressures on all four wheels will be equal and will not interfere with the steering forces generated by the differential engagement of the wheel treads with the inner and outer track rails.

By utilizing the tread brakes to supply a part of the total required braking force, the braking force required from the disc brakes is proportionately reduced so that the disc brake torque reaction tending to rotate adaptors 7 in the same direction as the forward rotation of the wheels is substantially less than if only disc brakes were provided. Thus, when the brakes are applied and wheels 1 decelerate, the pad devices 11, 13 on the trailing side of the axles are subjected to additional compression and the pad devices 11, 13 on the leading side of the axles are subjected to reduced compression to provide a reaction acting on each adaptor at the intersection of the effective load lines 50 well below the axle center and thereby producing a torque on the adaptors, tending to rotate the adaptors in a direction opposite the forward rotational direction of wheels 1 and countering the disc brake torque reactions on the adaptors.

The details of the truck including the axle suspension and brake mechanism described herein may be varied substantially without departing from the spirit of the invention and the exclusive use of such modifications as come within the scope of the appended claims is contemplated.

We claim:

1. In a railway truck having a pair of longitudinally spaced wheel and axle assemblies each comprising an axle and a pair of wheels mounted thereon, bearing structures including journal bearings supported on the end portions of said wheel and axle assemblies at each side of the truck, a rigid truck frame, vertically and longitudinally yieldable means supporting said truck frame on said bearing structures to permit said bearing structures to move vertically with respect to said truck frame for cushioning vertical impacts received by the wheels from the track structure and to accommodate turning movements of said wheel and axle assemblies in the horizontal plane with respect to said truck frame, a brake disc mounted on the central portion of at least one of said axles, a yoke having side members fixedly mounted on the bearing structures on said one axle, and disc brake mechanism including opposing shoes mounted on said yoke and positioned on opposite sides of said disc, said bearing structures forming the sole support of said yoke, and through said yoke, of said disc brake mechanism whereby to facilitate turning movements of the respective wheel and axle assemblies in the horizontal plane while maintaining the normal orientation of said disc brake mechanism with respect to said axle-mounted brake disc, said frame supporting means being arranged to oppose tipping longitudinally of the truck by said bearing structures and the yoke supported thereby about the axis of said one axle in response to disc brake torque reactions received by said structures from said yoke.

2. In a railway truck according to claim 1, a similar brake disc on the other axle, a similar yoke similarly mounted on the bearing structures of said other axle and mounting similar disc brake mechanism.

3. In a railway truck according to claim 2, a tread brake comprising substantially upright levers pivotally suspended from the sides of said truck frame adjacent the wheels longitudinally inboard thereof, brake shoes carried by said levers and engageable with the respective wheel treads responsive to longitudinal separation of said levers, an extensible rod device connecting said levers and including a cylinder connected to one of said levers and a piston therein connected to the other of said levers and a hydraulic interconnection between said cylinders at opposite sides of the truck whereby to positively equalize braking pressure on the separate tread brake shoes on both sides of the truck irrespective of variations in the longitudinal spacing of the wheels on the opposite sides of the truck resulting from steering movements of said wheel and axle assemblies, said supporting means being resilient and arranged such that the effective load lines passing through them from said truck frame to said bearing structures intersect at a level substantially below axle centers whereby retardation forces applied to said wheel and axle assemblies cumulatively by said disc and tread brakes cause a torque reaction on said bearing structures tending to rotate said bearing structures in a direction opposite the direction of rotation of the wheels and thereby oppose tendencies of the disc brake torque reaction to rotate said bearing structures in the same direction as the forward rotation of the wheels.

4. In a railway truck according to claim 2, means interconnecting said yokes to cause said yokes and said wheel and axle assemblies to pivot in opposite senses in the horizontal plane while maintaining said yokes aligned longitudinally of the truck.

5. In a railway truck according to claim 4, said bearing structure including adaptors mounted on said journal bearings, said yoke side members being affixed to said adaptors, said journal bearings being movable transversely of the truck with respect to said adaptors to permit corresponding transverse movement of each said wheel and axle assembly with respect to the other as may be required to allow the wheels to follow lateral offsets in the track rails without interference from said interconnecting means.

6. In a railway truck according to claim 4, said interconnecting means comprising rigid links pivotally connected at their opposite ends to the diagonally opposite sides of the respective yokes such that the wheel and axle assemblies are free to turn in the horizontal plane for steering purposes while the yokes are restrained from relative movement transversely of the truck with respect to each other.

7. In a railway truck according to claim 6, said bearing structures including adaptors mounted on said journal bearings to permit movement transversely of the truck of said journal bearings with respect to said adaptors and the pivotal connections of said links to the respective yokes to permit corresponding lateral movements of each said axle with respect to the other axle as may be required to allow the wheels to move laterally to follow lateral offsets in the track rails without interference from said links.

8. In a railway truck according to either of claims 5 or 7, an annular grommet of elastomeric material positioned between each said journal bearing and the respective adaptors and being yieldable in shear transversely of the truck to accommodate relative transverse movements between said journal bearings and the respective adaptors.

9. In a railway truck according to claim 1, said truck frame side members being formed with downwardly open pedestal jaws embracing the respective adaptors, said pedestal jaws having inwardly facing surfaces inclined towards each other upwardly, said adaptors having correspondingly inclined outer transverse surfaces spaced longitudinally of the truck from said pedestal jaw inner surfaces, and elastomeric pad devices positioned between said opposed adaptor and pedestal jaw surfaces and elongated parallel to the inclination of said surfaces whereby said pad devices accommodate substantial vertical movements of said adaptors with respect to said truck frame through shear in a direction parallel to and compression generally normal to the inclination of said pad devices and said opposed adaptor and pedestal jaw surfaces.

10. In a railway truck according to claim 9, said pad devices and said opposed surfaces of said adaptors and pedestal jaws being generally of V-shape in plan with their apices pointed longitudinally of the truck and being acutely angled whereby to accommodate substantial movements of the adaptors in the pedestal jaws longitudinally of the truck through shear deflection of the pad devices and thereby permit turning movement of the truck in the horizontal plane while opposing substantial movement of the adaptors transversely of the truck through resistance of the pad devices to compression transversely of the truck.

11. In a railway truck according to either of claims 9 or 10, upright metal springs seated on the tops of said adaptors and supporting said truck frame in parallel with said pad devices.

12. In a railway truck according to claim 11, said upright springs on each adaptor being disposed longitudinally of the truck with respect to each other.

13. In a railway truck according to claim 1, said supporting means being resilient and arranged such that the effective load lines passing through them from said truck frame to said bearing structure intersect at a level substantially below axle center whereby deceleration of the wheel and axle assembly from braking causes a torque reaction on the bearing structures on said axle tending to rotate said bearing structures in a direction opposite the direction of rotation of the wheels and thereby opposes tendencies of the disc brake torque reaction to rotate said bearing structure in the same direction as the forward rotation of the wheels.

14. In a railway truck according to claim 13, said supporting means comprising elastomeric pad devices on the fore and aft sides of the respective bearing structures, said pad devices being symmetrically inclined longitudinally of the truck, said bearing structure and said truck frame having surfaces similarly inclined to said pad devices and being in load bearing relation therewith, such that the effective load lines through said pad devices intersect at a level substantially lower than that of the respective axle center.

15. In a railway truck according to either of claims 13 or 14, a tread brake arrangement actuable in parallel with said disc brake mechanism whereby to supplement the braking effect of said disc brake arrangement and thus reduce the required disc brake force and the disc brake torque reaction on the bearing structures tending to rotate the latter in the same direction as the wheel and axle assemblies to a value countered by the torque applied to the bearing structures by said resilient supporting means responsive to deceleration of the wheel and axle assembly, tending to cause said bearing structures to rotate in a direction opposite the direction of rotation of the wheel and axle assemblies.

* * * * *